Figure 1:
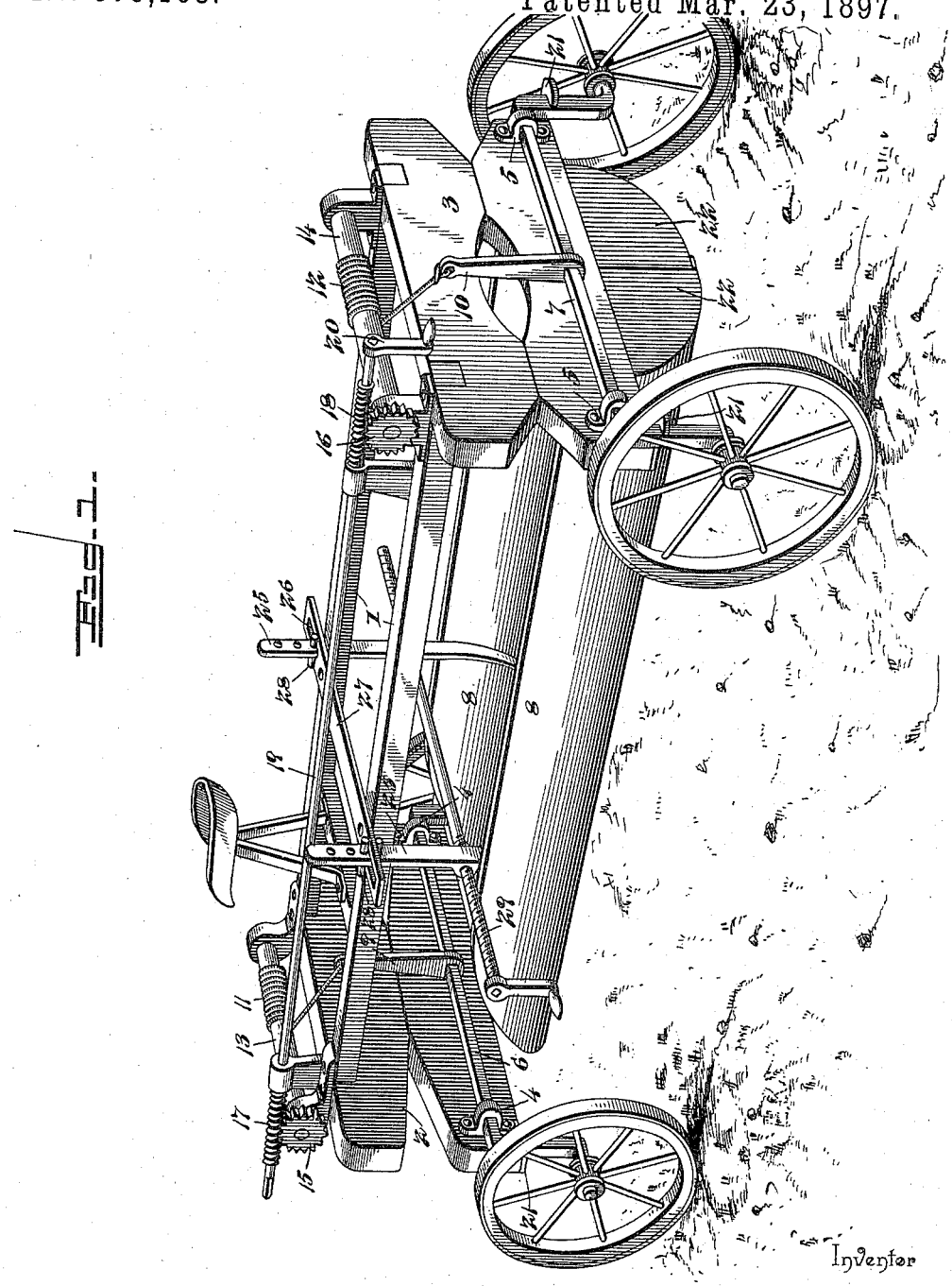

(No Model.) 2 Sheets—Sheet 1.

H. MULLEN.
MACHINE FOR LOADING, CARRYING, AND DISTRIBUTING MANURE, &c.

No. 579,163. Patented Mar. 23, 1897.

Witnesses
E. H. Stewart
T. F. Riley

Inventor
Henry Mullen
By his Attorneys,
C. A. Snow & Co.

THE NORRIS PETERS CO., PHOTO-LITHO., WASHINGTON, D. C.

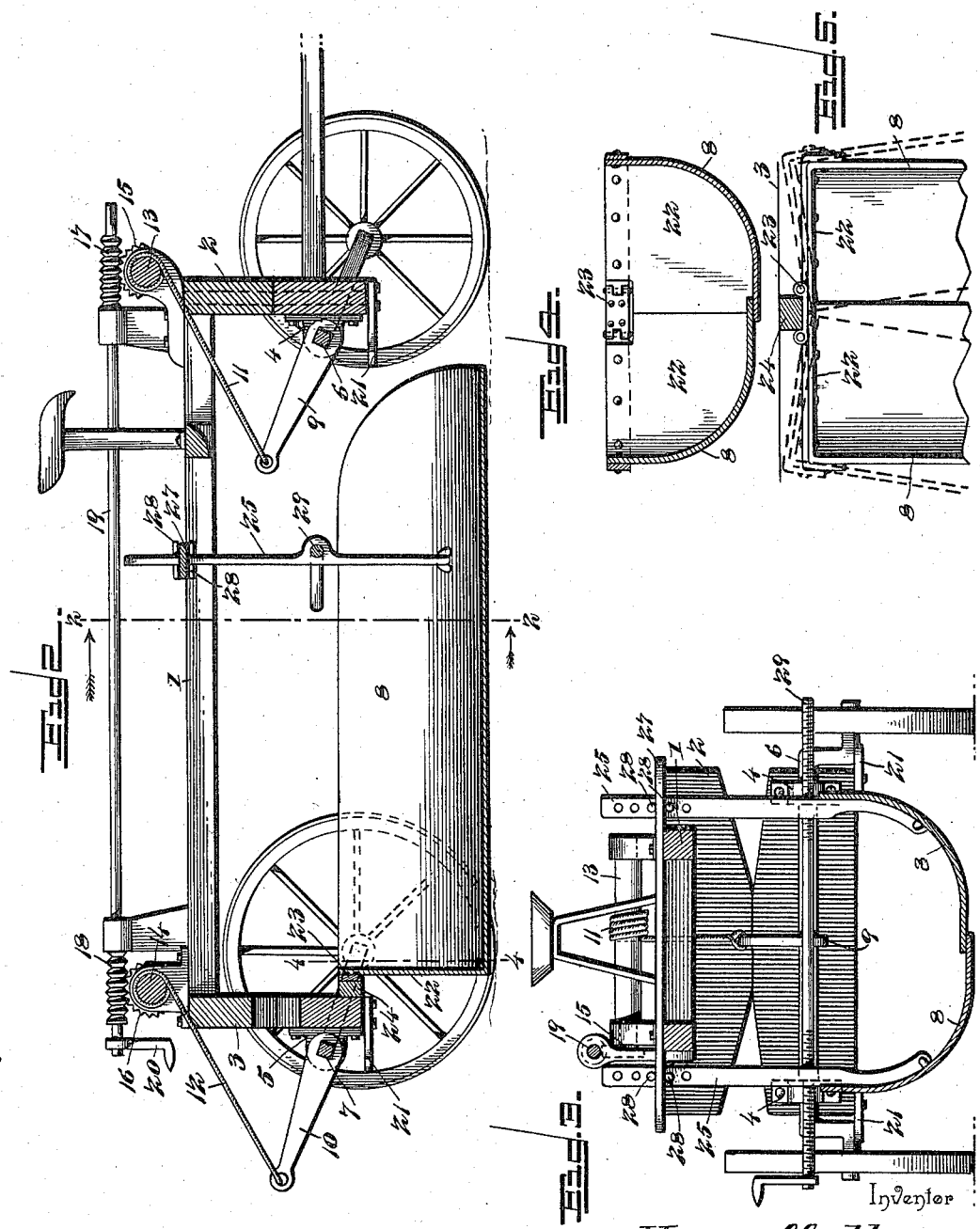

UNITED STATES PATENT OFFICE.

HENRY MULLEN, OF LAWLER, IOWA.

MACHINE FOR LOADING, CARRYING, AND DISTRIBUTING MANURE, &c.

SPECIFICATION forming part of Letters Patent No. 579,163, dated March 23, 1897.

Application filed November 18, 1896. Serial No. 612,609. (No model.)

*To all whom it may concern:*

Be it known that I, HENRY MULLEN, a citizen of the United States, residing at Lawler, in the county of Chickasaw and State of Iowa, have invented a new and useful Machine for Loading, Carrying, and Distributing Manure, Earth, &c., of which the following is a specification.

The invention relates to improvements in machines for loading, carrying, and distributing manure, earth, and the like.

The object of the present invention is to provide a simple and comparatively inexpensive machine which will be adapted for rapidly collecting and loading manure scattered over a field and which will be capable of scattering or distributing manure or fertilizer over a field to distribute the same conveniently.

A further object of the invention is to provide a machine which will be adapted to readily load a pile of earth and which will enable the same to be quickly discharged when it is desired to dump it.

The invention consists in the construction and novel combination and arrangement of parts hereinafter fully described, illustrated in the accompanying drawings, and pointed out in the claims hereto appended.

In the drawings, Figure 1 is a perspective view of a machine constructed in accordance with this invention, the shovels being elevated for carrying a load. Fig. 2 is a longitudinal sectional view, the shovels being lowered for loading the machine. Fig. 3 is a transverse sectional view. Fig. 4 is a transverse sectional view of the shovels, showing them closed. Fig. 5 is a plan view of the same, the shovels being open for discharging a load.

Like numerals of reference designate corresponding parts in all the figures of the drawings.

1 designates a substantially oblong supporting-frame arranged horizontally and composed of side bars and suitable connecting-bars and mounted upon front and rear bolsters 2 and 3 to form a running-gear. The bolsters 2 and 3 are provided at their rear faces with bearings 4 and 5, receiving front and rear crank-axles 6 and 7, which are journaled at their tops or arched portions, and the upper or arched portions of the crank-axles are adapted to oscillate to raise and lower the supporting-frame 1 to lower a pair of shovels 8 from an elevated position, as shown in Fig. 1 of the accompanying drawings, to the surface of the ground, as illustrated in Fig. 2 of the drawings. The shovels are lowered to the ground for the purpose of loading the machine, as hereinafter described, and are raised for carrying the load.

The crank or arched axles are provided at their tops at a point between the bearings with upwardly-extending arms 9 and 10, which are connected by cables 11 and 12, or other suitable flexible connections, with front and rear transverse shafts 13 and 14, journaled on the supporting-frame at the ends thereof. The transverse shafts are provided at one side of the machine with worm gear-wheels 15 and 16, which mesh with front and rear worms 17 and 18 of a longitudinal shaft 19. The longitudinal shaft 19, which is journaled in suitable bearings of the supporting-frame and which is located at one side thereof, is provided at its rear end with a crank-handle 20, by means of which it is rotated. When the longitudinal shaft is rotated to unwind the cables or other flexible connections from the transverse shafts, the weight of the supporting-frame will cause the arched portions of the axles to swing downward, and by rotating the longitudinal shaft in the opposite direction the cables are wound around the transverse shafts and the arched portions of the axles are swung upward.

When the axles are swung upward, they are prevented from swinging forward beyond a perpendicular position by substantially L-shaped arms or plates 21, secured to the lower faces of the front and rear bolsters and forming stops for engaging the vertical portions of the crank or arched axles, as clearly illustrated in Fig. 1 of the drawings. The cables will prevent the axles from swinging outward accidentally, and the worms, when in a state of rest, operate to lock the gear-wheels against rotation.

The shovels 8, which are disposed longitudinally of the supporting-frame, are transversely curved to form a substantially semi-cylindrical scoop or body to receive the load to be carried. Their front edges are curved, as shown, to provide an open end or mouth for the scoop or body, and they are provided at the back of the machine with substantially quadrant-shaped end portions 22, which are disposed vertically and which are connected at their upper edges with the rear bolster by the horizontally-disposed hinges 23. The hinges 23 are mounted on a central block 24 of the rear bolster to offset the shovels from the said bolster to provide sufficient space for them to swing apart, as illustrated in dotted lines in Fig. 5 of the drawings, in the operation of loading and discharging the load.

In loading the machine the shovels are lowered to the position illustrated in Fig. 2 of the drawings, and they are spread apart by means hereinafter described, and the machine is moved upward to cause the shovels to run under the material to be loaded, and the shovels are then closed on the mass of earth, manure, or other material to confine the same. In discharging the load the shovels are opened to a greater or less extent to produce the necessary discharge, and the machine may be driven over a field, so as to distribute manure, fertilizer, or earth evenly over the same.

The front portions of the shovels are suspended from the running-gear at about the center thereof by vertically-disposed supporting-bars 25, hinged at their lower ends to the inner faces of the shovels and extending upward through slots 26 of a transverse bar 27, and the upper portions of the supporting-bars are provided with a series of perforations adapted to receive pins 28, whereby the supporting-bars are adjustably connected to the transverse bar 27 to set the shovels properly. The pins 28 are arranged in pairs at each end of the transverse bar 27 and are located above and below the same. The upper pins support the shovels and prevent the bars 25 from dropping through the slots 25, and the lower pins engage the transverse bar 27 and hold the shovels firmly against any upward movement.

The opening and closing of the shovels are effected by a transversely-disposed adjusting-screw 29, having right and left hand threaded portions engaging correspondingly-threaded openings of the supporting-bars, whereby when the adjusting-screw is rotated the shovels will be simultaneously moved inward or outward, according to the direction of the rotation of the screw. One end of the screw is provided with a crank-handle by means of which it is operated.

The machine is especially adapted for collecting manure which may be scattered over a large field and for distributing manure or fertilizer, and it will be apparent that the machine is simple, strong, and durable, that it is adapted to be readily loaded and unloaded, and that it may be readily regulated to discharge a load in the desired quantity.

Changes in the form, proportion, and minor details of construction may be resorted to without departing from the principle or sacrificing any of the advantages of the invention.

What I claim is—

1. In a machine of the class described, the combination of a supporting-frame, front and rear crank-axles journaled at their tops on the supporting-frame and adapted to oscillate to raise and lower the same, transverse shafts journaled on the supporting-frame, connections between the shafts and the crank-axles, gear-wheels mounted on the transverse shafts, and a longitudinal shaft journaled on the supporting-frame and provided with worms meshing with the said gear-wheels, substantially as and for the purpose described.

2. In a machine of the class described, the combination of a supporting-frame, front and rear crank-axles, provided at their tops with arms and journaled on the supporting-frame, transverse shafts mounted on the supporting-frame, cables extending from the shafts and connected with the arms of the crank-axles, and gearing for rotating the transverse shafts, substantially as described.

3. In a machine of the class described, the combination of a supporting-frame, crank-axles provided at their tops with arms and journaled on the supporting-frame, transverse shafts mounted on the supporting-frame, cables connected with the arms of the crank-axles and with the said shafts and adapted to be wound around the same and unwound therefrom, gear-wheels carried by the transverse shafts, and a longitudinal shaft journaled on the supporting-frame and provided with worms meshing with the said gear-wheels, substantially as and for the purpose described.

4. In a machine of the class described, the combination of a supporting-frame forming a running-gear, means for raising and lowering the same, and a pair of longitudinally-disposed shovels carried by the supporting-frame, forming a scoop and hinged at their rear ends, whereby they are adapted to spread apart, substantially as and for the purpose described.

5. In a machine of the class described, the combination of a supporting-frame forming a running-gear, means for raising and lowering the same, a pair of longitudinally-disposed shovels carried by the supporting-frame, forming a scoop and hinged at their rear ends, and a transversely-disposed adjusting-screw connected with the shovels and provided with right and left hand threaded portions, whereby the shovels are moved simultaneously outward and inward, substantially as described.

6. In a machine of the class described, the combination of a supporting-frame forming a running-gear means for raising and lowering the same, a pair of longitudinally-disposed shovels forming a scoop and hinged at the back to the supporting-frame, vertically-disposed supporting-bars adjustably connected with the supporting-frame and hinged at their lower ends to the shovels, and an adjusting-screw mounted on the supporting-bar and adapted to open and close the shovels, substantially as described.

7. In a machine of the class described, the combination of a supporting-frame forming a running-gear, a pair of shovels disposed longitudinally thereof and hinged at their back, a transverse bar secured to the supporting-frame and provided at its ends with heads, supporting-bars hinged at their lower ends to the shovels and extending through the slots of the transverse bar, pins passing through the supporting-bars and adjustably securing the same to the transverse bar, and an adjusting-screw connecting the supporting-bars, substantially as described.

In testimony that I claim the foregoing as my own I have hereto affixed my signature in the presence of two witnesses.

HENRY MULLEN.

Witnesses:
L. S. KUCKER,
G. E. KUCKER.